United States Patent

[11] 3,575,201

| [72] | Inventors | John G. MacDonald;<br>George S. Morley, Goderich, Ontario, Canada |
|---|---|---|
| [21] | Appl. No. | 796,714 |
| [22] | Filed | Feb. 5, 1969 |
| [45] | Patented | Apr. 20, 1971 |
| [73] | Assignee | The Dominion Road Machinery Co. Limited |

[54] MULTIPLE HYDRAULIC VALVE UNIT
2 Claims, 8 Drawing Figs.

[52] U.S. Cl. ................................................. 137/352
[51] Int. Cl. .................................................. E01h 1/00
[50] Field of Search .......................................... 137/352, 608, 596.14, 596.15

[56] References Cited
UNITED STATES PATENTS

| 2,247,140 | 6/1941 | Twyman | 137/608X |
| 2,289,567 | 7/1942 | Berglund | 137/608X |
| 2,607,558 | 8/1952 | Wright | 137/352 |
| 2,623,541 | 12/1952 | Seppmann | 137/352X |
| 2,651,324 | 9/1953 | Hodgson et al. | 137/608X |
| 3,135,290 | 6/1964 | Carls | 137/608 |
| 3,368,576 | 2/1968 | Crissey | 137/608X |
| 3,384,114 | 5/1968 | Hathaway et al. | 137/608 |

*Primary Examiner*—Samuel Scott
*Attorney*—Douglas S. Johnson

ABSTRACT: The control valve is for use primarily in vehicles such as motor graders and has a valve body with a central aperture surrounding the steering shaft. The valve body has a number of chambers, each containing an individual valve spool operated by a manual lever, each valve spool having a pair of necked portions with end lands and a middle land. Each chamber has an inlet port and, inward of the end lands, a pair of exit ports which are connected by passages in the valve body to the inlet port of the next valve chamber. Each chamber also has a pair of cylinder ports, inward of the exit ports, adapted for connection to a double-acting pressure cylinder through a conventional lock valve. Movement in either direction of a selected valve spool from the neutral position where fluid is directed equally to the exit ports causes one of the end lands to close the nearest exit port, and the middle land then directs fluid out through the cylinder port located adjacent to the closed exit port into the cylinder and back through the other cylinder port, then through the other exit port into the passage and to the next valve chamber. A particular feature of the valve body is that all the ports and passages in the valve body may be formed of connecting holes drilled from the exterior surface of the valve body.

PATENTED APR20 1971　　3,575,201

INVENTOR
John G. Macdonald
BY George S. Morley

Douglas S. Johnson
ATTORNEY

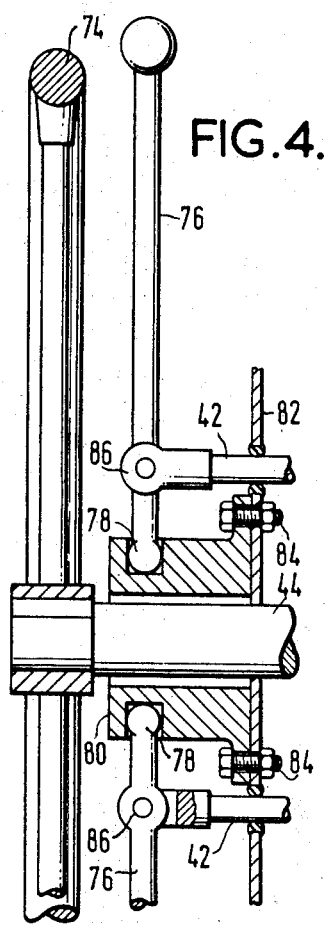
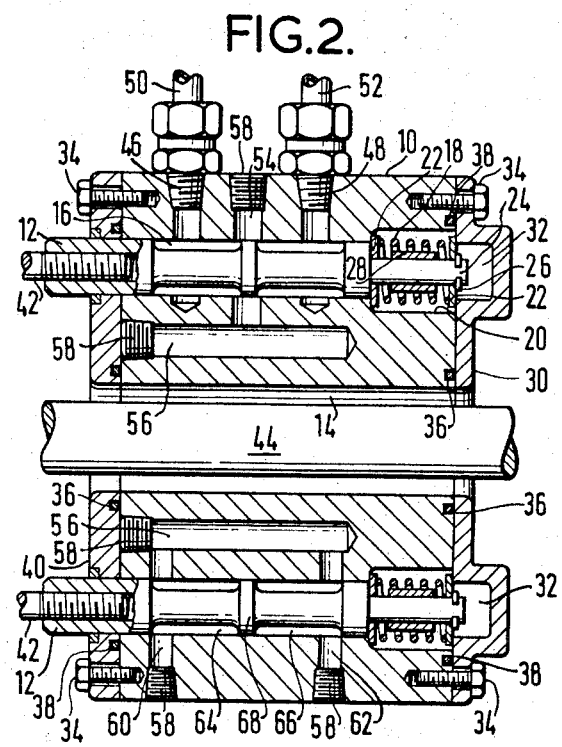
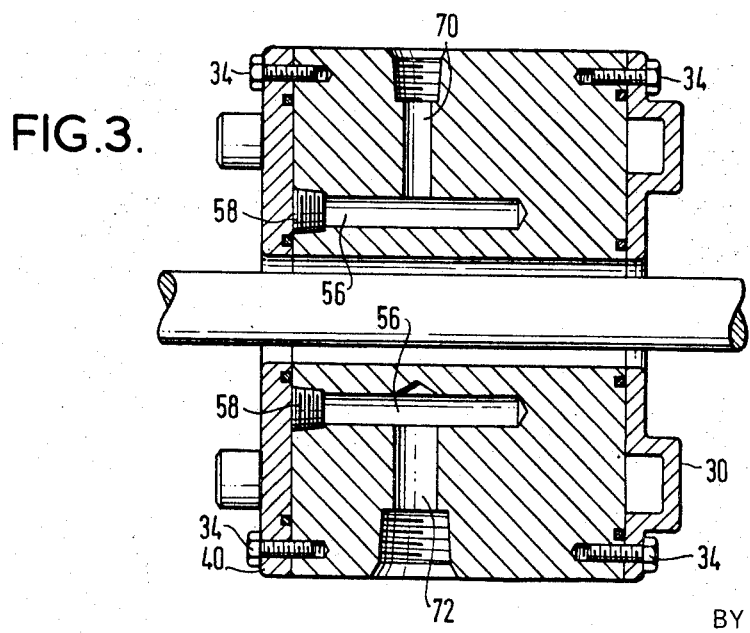

INVENTOR
John G. Macdonald
George S. Morley
BY
Douglas S. Johnson
ATTORNEY

MULTIPLE HYDRAULIC VALVE UNIT

FIELD OF THE INVENTION

This invention relates to a multiple hydraulic valve unit of compact configuration having operational and constructional features making it especially suitable for use in work vehicles such as motor graders where the operator may often be required to manipulate a valve control with one hand while steering the vehicle with the other hand.

SUMMARY OF THE INVENTION

The valve unit of the invention has a plurality of valve chambers, each having a sliding spool-type valve, the valve chambers being radially disposed within a common body which has a central hollow passage which contains the shaft of a steering gear. The valve chambers are interconnected by means of a series of simple drill holes in the valve body which serve as fluid passages. The arrangement of the holes is such that one or more control valves may be operated simultaneously, in series, using a valve spool of simple design having a minimum number of lands required to seal off the fluid ports. The radial disposition of the valves within the valve body enables the manual control levers, one to each valve spool, to be disposed compactly and conveniently about the shaft of the steering gear.

It is an important feature of the invention that the valve control unit can be mounted anywhere along the axis of the steering shaft and connected to the manual control levers at the steering wheel by simple direct linkages.

It is a further feature of the invention that the arrangement of the drill passages connecting the valve chambers enables two or more control levers to be operated simultaneously while permitting use of simple, easy to manufacture valve spools having a minimum number of port closing lands on the spool.

It is another feature of the invention that it provides an extremely compact and inherently rigid valve body which minimizes the possibility of warping and binding of the valve spools under severe mechanical and hydraulic stress.

It is another feature of the valve unit that it can be manufactured economically and at low cost using a lathe and boring equipment without the need for expensive milling operations.

DESCRIPTION OF THE DRAWINGS

The invention will now be described in relation to the accompanying drawings in which:

FIG. 2 is a section through the valve unit taken on the lines 2–2 of FIG. 1;

FIG. 3 is a section through the valve unit taken on the lines 3–3 of FIG. 1;

FIG. 4 is a cross-sectional view through a steering wheel and surrounding valve unit showing two control levers which connect to the valve unit;

DESCRIPTION OF THE PREFERRED EMBODIMENT

Figure 1:
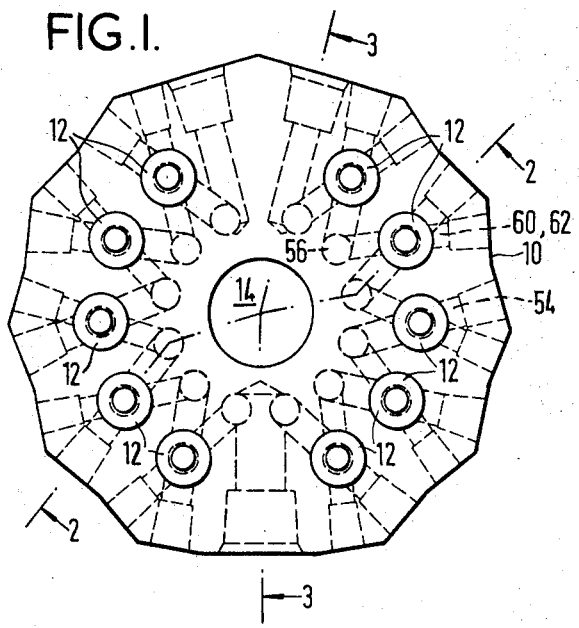
FIG. 1 is an end view of the valve unit.

With reference to FIG. 1, the valve body 10 contains a series of valve spools 12 and has an opening 14 through the center of the body. A series of drilled holes which serve as fluid passages are shown in dotted outline.

Referring to the upper half of FIG. 2, the valve spool 12 is slidably disposed within a bored hole 16 which extends longitudinally through the valve body 10. A centering spring 18 is contained within a larger diameter portion 20 of the valve bore 16. The valve spring 18 is restrained against washers 22 which are arranged loosely on a shank portion 24 of the valve spool 12. A retaining ring 26 holds the washers 22 and spring 18 in position on the valve spool shank portion 24. A loose sleeve 28 limits the travel of the washers 22 on the shank portion 24. A cover member 30 which contains a circular clearance passage 32 is fastened to the valve body 10 by bolts 34 and sealed by O-rings 36 and 38. A similar cover member 40 is disposed at the opposite end of the valve body 10. The valve spools 12 extend through openings in the cover member 40. Rod members 42 are threaded into the end of the valve spools 12. The hollow passage 14 through the valve body 10 and covers 30 and 40 permits free passage of the steering shaft 44 through the center of the valve unit 10.

Referring again to FIG. 2, individual passages 46 and 48, drilled from the surface of the valve body 10, intercept each longitudinal valve chamber 16. The drilled passages 46 and 48 are suitably threaded for connection to hydraulic lines 50 and 52, the drilled passages 46 and 48 serving as cylinder ports. In between each pair of valve chambers 16 is a substantially parallel passage 56, also drilled longitudinally from the surface of the valve body 10; the outer end of each drilled passage 56 is sealed by a pipe plug 38. A series of passages 54 are drilled from the surface of the valve body 10 normal to the passages 56; an individual passage 54 intercepts an individual passage 56. The outer end of the passage 54 is closed by a plug 58. Pairs of spaced-apart passages 60 and 62 are also drilled from the surface of the valve body 10, these drilled passages 60 and 62 individually intercepting each of the drilled passages 56. The arrangement is such, and shown more particularly in FIGS. 7 and 8, that each drilled passage 56 is connected on one side by the drilled passage 54 to one of the spool valve chambers 16 between which it is situated, while the other passages 60 and 62 connect the drilled passage 56 to the other valve chamber 16 between which it is located. The passage 54 serves as an inlet port to the valve chamber 16 while the passages 60 and 62 serve as outlet ports to each valve chamber 16.

The valve spool 12 has neck portions as 64 and 66, thus providing suitable end lands, with the land 68 disposed between the neck portions 64 and 66.

With reference to FIG. 3, which shows a section through the valve unit 10 taken on the lines 3–3 of FIG. 1, a drilled fluid passage 70, which serves as the oil inlet, connects with one of the series of longitudinally disposed drilled passages 56. Another larger diameter drilled passage 72 connects with another one of the passages 56 and serves as an oil outlet.

FIG. 4 shows the steering wheel 74 fastened to shaft 44. The control levers 76 one to each spool and surrounding the steering column 44 are journaled at 78 in a boss 80 fastened to the wall of the operator's cab 82 by nuts and bolts 84. The control rods 42 are fastened to the levers 76 by clevises 86.

Figure 6:
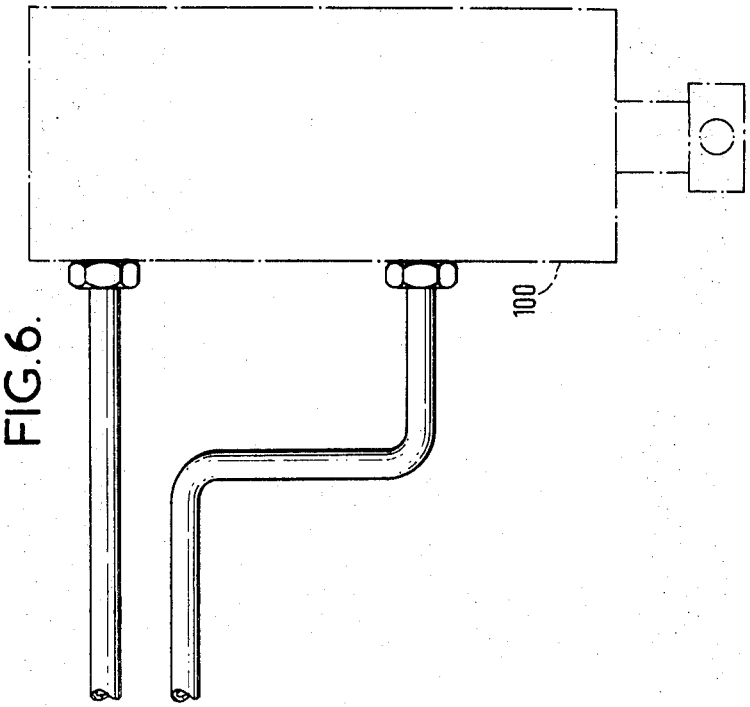
FIG. 6 is an outline of a typical double-acting hydraulic cylinder connected to the conventional lock valve.
Figure 5:
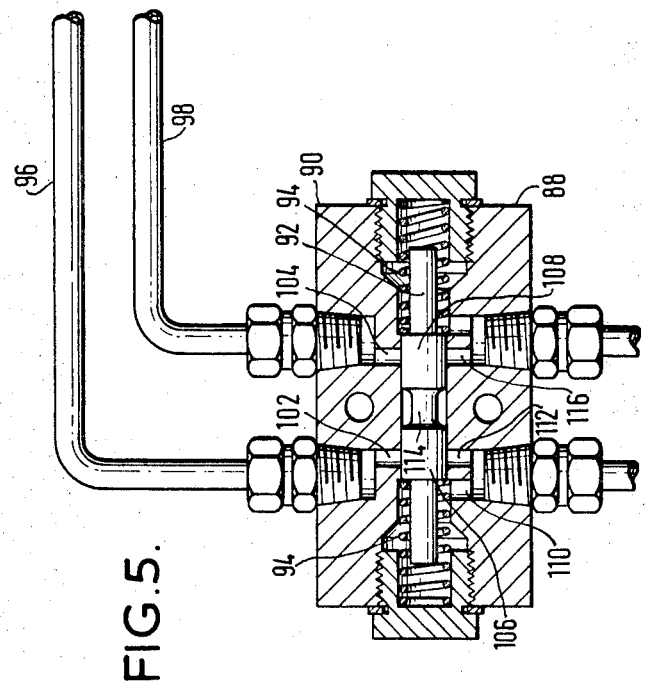
FIG. 5 is a cross-sectional view through a conventional lock valve connected to one of the valve chambers in the unit.

Referring now to FIG. 5, there is shown a conventional lock valve 88 which may be separately mounted at a different location on the vehicle, but individual to each chamber 16 and connected to hydraulic lines 50 and 52 the lock valve 88 consists of a body 90 containing a valve spool 92 normally here in a central position by springs 94. Fluid lines 96 and 98 connect the lock valve 88 to a typical individual double acting hydraulic cylinder 100 shown in FIG. 6. Ports 102 and 104 are normally closed by the lands 106 and 108 on the valve spool 92 thus locking the oil in lines 96 and 98 and cylinder 100. Oil under pressure acting through line 50 would flow through port 110 moving the spool 92 to the right. This would open port 102 allowing the oil to flow through line 96 to the cylinder 100. Oil returning from the opposite end of cylinder 100 through line 98 would pass through port 104 which would now be lined up with the neck portion 114 of the valve spool 92, and so oil would flow through port 116 into the line 52. If oil under pressure were to enter through line 52 and return through line 50, the cylinder 100 would operate in the opposite direction and the valve spool 92 would shift to the left. As soon as the oil pressure is equal in lines 50 and 52, the valve spool 92 would return to the middle, centered position closing ports 102 and 104 thus holding oil in the cylinder.

Figure 7:
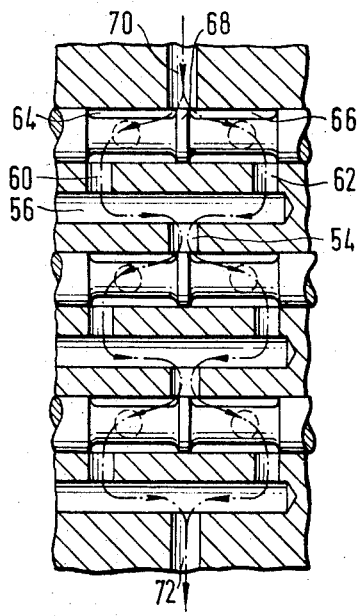
FIG. 7 is a schematic sectional view through three valves showing the passage of fluid through the holes connecting the valves, with all valves in neutral.

FIG. 7 is a schematic sectional view of three valves in vertical position with connecting passages to show the flow of oil through the inlet port 70, then through the neck portions 64 and 66 of the first valve spool and then through passages 60 and 62 into passage 56. Oil then passes through passage 54 into the second valve and through similar porting through the third valve and out through passage 72.

Figure 8:
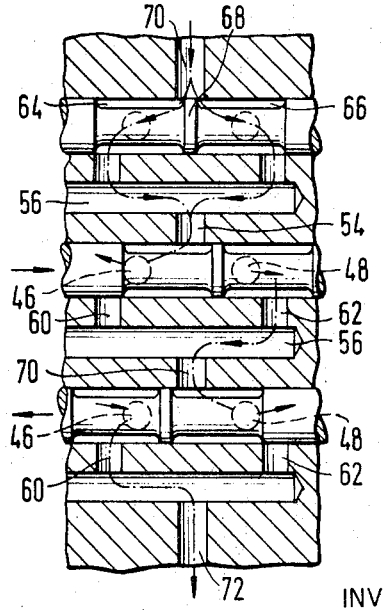
FIG. 8 is a schematic sectional view through three valves showing the passage of fluid through the holes connecting the valves when the top valve spool is in the centered neutral position, the middle valve is shifted to the right and the bottom valve is shifted to the left.

FIG. 8 is a schematic sectional view through three valve spools 12, the uppermost one being in a neutral position, the middle one manually shifted to the right and the lower one manually shifted to the left. It will be observed that fluid from the inlet port 70 is divided equally by the land 68 through the passages 60 and 62, then enters the longitudinal passage 56. It then enters the inlet port 54 of the second valve chamber 16 and, because passages 60 and 62 are cut off by the lands, the fluid flows into passage 46 and then line 50. The subsequent flow of fluid through the cylinder 100 has already been described in relation to FIG. 5. The fluid returns through the line 52 into passage 48, then into outlet port 62 and then into passage 56. The flow of fluid in the separately operated lower valve chamber 16 is in the opposite direction as compared to the middle valve chamber 16, such flow being clearly indicated by the arrows.

I claim:

1. A fluid control unit for vehicles comprising an annular one piece body having removable caps disposed on opposite ends of said body, a series of valve chambers extending radially through said body, said chambers being in substantially parallel relation to the axis of said body, a slideable valve spool extending into each of said chambers through an opening in one of said caps, each of said spools having two necked portions along said spool separated by a central land on said spool, an inlet port in each of said chambers, said inlet port bridging said central land and dividing the fluid flow through said inlet port into both of said necked portions when said spool is in a neutral position, an outlet port in each of said chambers adjacent to the outer end of each of said necked portions of said spools, both of said outlet ports communicating through fluid passages within said body with the inlet port of the next valve chamber in the series when said spool is in neutral, a cylinder port in said chamber located between said inlet port and each of said outlet ports, both of said cylinder ports communicating with said inlet port and said outlet ports when said spool is in neutral, movement of said spool from neutral to either one of two operating positions closing one of said outlet ports and diverting all fluid from said inlet port into a cylinder port located at the same end of said chamber as said closed outlet port while fluid returning through the second cylinder port is directed through the second outlet port into the next valve chamber in the series.

2. A fluid control unit according to claim 1 in which said annular body is adapted to encompass the shaft of a steering mechanism and a series of manually operated levers are disposed radially about the axis of and adjacent the steering wheel of said steering mechanism, a link member connecting each of said levers to one of said valve spools to enable said spools to be moved independently from neutral to one of said two operating positions.